Figure 1:
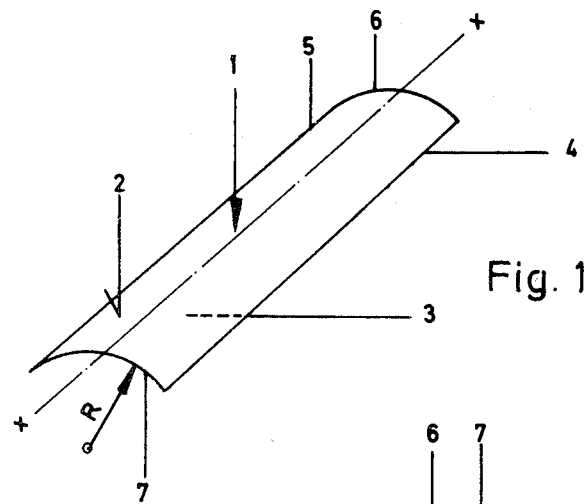

United States Patent [19]
Imme et al.

[11] 3,950,044

[45] Apr. 13, 1976

[54] METHOD FOR THE PRODUCTION OF CONCENTRIC MACHINE ELEMENTS

[75] Inventors: Helmut Imme, Friedberg; Werner Moser, Augsburg, both of Germany

[73] Assignee: SKF Industrial Trading and Development Company, B.V., Jutphaas, Netherlands

[22] Filed: Nov. 18, 1974

[21] Appl. No.: 524,490

[30] Foreign Application Priority Data

Dec. 22, 1973  Germany............................ 2364223

[52] U.S. Cl................ 308/23; 308/237 R; 308/238
[51] Int. Cl.² .......................................... F16C 3/06
[58] Field of Search ... 308/9, 23, 72, 237 R, 237 A, 308/238, 244, DIG. 1

[56] References Cited
UNITED STATES PATENTS

| | | | |
|---|---|---|---|
| 2,741,018 | 4/1956 | Schaefer....................... | 308/237 RX |
| 2,844,420 | 7/1958 | Allen ................................ | 308/244 |
| 3,503,820 | 3/1970 | Galbato ......................... | 308/238 X |
| 3,575,787 | 4/1971 | Pietrocini et al. .............. | 308/238 X |

*Primary Examiner*—M. H. Wood, Jr.
*Assistant Examiner*—Gene A. Church
*Attorney, Agent, or Firm*—Daniel M. Rosen

[57] ABSTRACT

A method of manufacturing concentric machine elements from flat steel strips by permanently bending a flat steel strip of limited length along its longitudinal axis, and burring the concave surface of the strip, while supported, through the application of a force on the convex surface of the strip, so that a concentrically shaped casing is formed.

5 Claims, 4 Drawing Figures

U.S. Patent   April 13, 1976   3,950,044

METHOD FOR THE PRODUCTION OF CONCENTRIC MACHINE ELEMENTS

THE INVENTION

The invention relates to methods of manufacturing and particularly to a method for the production of concentric machine elements such as supports for shafts, axles, etc., from a flat strip of a springy material.

It is known from the German Pat. No. 640,449 that replaceable, semi-cylindrical bearing shells may be used as the support for connecting rods. In the known method a flat strip is bent by hand and inserted in a prefabricated bored hole. This strip then lies against the bored hole under stress. It is a disadvantage however, that manual work is required to introduce the bearing shells into the bored hole. Since such work cannot be done by machinery, the range of application of such a method cannot be extended to the building of such bearing shells in series.

It is accordingly the prime object of the present invention to provide a method by which concentric machine elements can be formed out of flat steel strips.

The foregoing object is attained according to the invention by permanently bending a flat steel strip of limited length along its longitudinal axis, and burring the concave surface of the strip, while supported, through the application of a force on the convex surface of the strip, so that a concentrically shaped casing is formed.

Bending the strip around its longitudinal axis with a certain division of stress, after the burring or rolling of the strip, results in transforming the strip into a concentric casing of closed or open shape. Both stress conditions are equivalent. The angle of grip may be either greater or smaller than 360°. This form, bent along the longitudinal axis, has the advantage that strips so formed can be easily stacked. The burring or rolling step can be done by means of mechanical devices so that a concentric casing is formed out of the flat strip, the edges of which can be joined together. According to the radius of curvature of the bent form of the strip that has not yet been rolled, a certain radius of curvature of the concentric casing is created.

In the production of such casings to be suitable for the support of machine elements it is also possible to first form a concentric casing from a strip through rolling. This casing is then burred to a flat strip with a convex-concave shape. The strip in this form can now be stacked, stored and transported to a place for assembly. Here the concentric stress condition is also produced through another burring step so that a bearing casing is produced, ready for assembly.

In a further advantageous embodiment of the invention, the flat strip may be either a springy steel or plastic. In accordance with the invention, the method described herein can be used for all materials which can stand elastic stresses without the danger of cracking.

According to the invention it is of advantage, when using spring steel, to use material which is at least partly coated with plastic.

Figure 2:
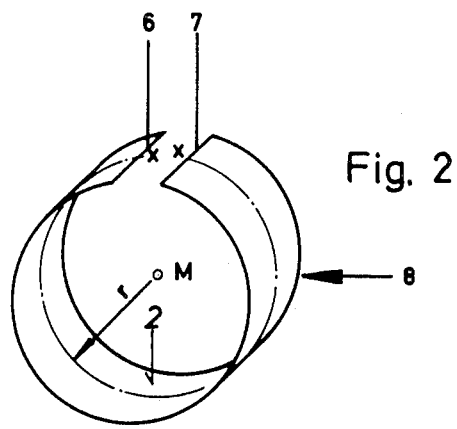
Figure 3:
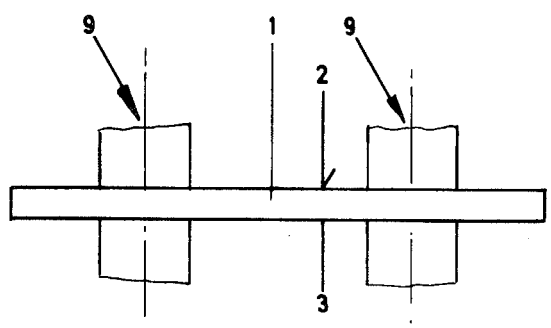
Figure 4:
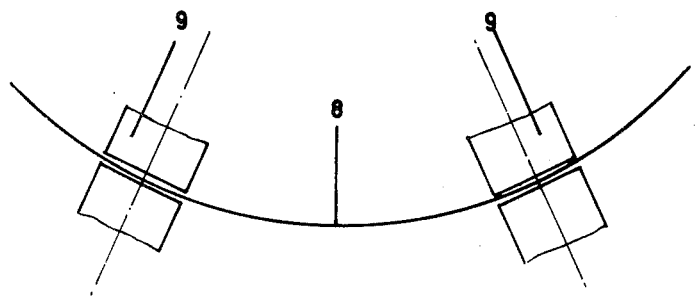

Further advantages, characteristics and other application possibilities of the invention will be evident from the following more detailed description and appended drawings, wherein:

FIG. 1 shows an axonometric view of a flat strip, bent along its longitudinal axis, and which is springy, FIG. 2 illustrates a concentric machine element, FIG. 3 details a flat strip according to FIG. 1 which is clamped for burring, in side view, and FIG. 4 shows a side view according to FIG. 3 of the burring step.

Referring to FIG. 1, a strip 1 is shown which is bent along its longitudinal axis x—x. The strip 1 has a convex upper surface 2 and a concave undersurface 3. The longitudinal edges 4, 5 are straight, while side edges 6, 7 follow a curvature radius R.

The strip 1 may be composed of a suitable springy material such as a spring steel band, a plastic, a plastic-coated spring steel band or a plastic into which metal fibers are introduced as reinforcement.

The bent strip 1 can be suitably produced as by the rolling of spring steel material with the radius R.

The curvature R shows that the material is under a certain stress. This stress can only be converted to an equivalent stress by burring, so that a concentric casing is formed as shown in FIG. 2. Here, the longitudinal axis x—x forms a circle or a part of a circle, whereas the side walls 6, 7 are not curved. A concentric machine element has thus been formed around a central point M with the radius r, or at least a practically concentric machine element, which forms a casing 8 or part of a casing 8. This casing 8 can by way of example be introduced to support machine elements in the bore of a housing (not shown). In such a position, it adapts itself to the wall, and its inner surface 2 serves to take up a shaft or axle (not shown).

In FIGS. 3 and 4 the burring step for the shaping of the casing 8 from the flat strip 1 is shown in side view. The strip 1 is clamped between two pairs of clamping jaws 9 which act on its convex upper surface 2 and its concave lower surface 3. When the pairs of clamping jaws 9 are bent out of their positions as shown in FIG. 3 into that shown in FIG. 4, whereby the center of the curvature lies on the side of the convex upper surface 2, the strip 1 is then burred and the concentric casing 8 is formed, as shown in FIG. 2.

Other devices can also be used for the burring or rolling step. For instance, the strip 1 can be rolled by two rollers so that the casing 8 is formed.

What is claimed is:

1. A concentric machine element forming all or a portion of a casing adapted to surround a further machine element, said concentric element comprising an elongated elastic spring material having a rolled curvature transverse to its longitudinal axis converted to a rolled curvature along its longitudinal axis and holding said stress in said longitudinal direction to form a longitudinally curved concentric machine element.

2. The concentric machine element of claim 1 wherein said element is a plastic coated steel spring material.

3. The concentric machine element of claim 1 wherein said element is a steel spring material having a metal fiber reinforcement.

4. The concentric machine element of claim 1 wherein said element is a plastic material.

5. A concentric machine element forming all or a portion of a casing adapted to surround a further machine element, said concentric machine element comprising a bistable element having a first stable condition constituting a linear longitudinal axis and a lateral axis having a preformed curvature and a second stable condition wherein said preformed curvature is proportionally translated to said longitudinal axis and said lateral axis is translated from said curvature to a linear shape, said concentric machine element being convertible between said first and second states.

* * * * *